United States Patent [19]

Henderson et al.

[11] 4,279,336
[45] Jul. 21, 1981

[54] SINGULATOR

[75] Inventors: Jerald M. Henderson, Davis; Yuen-Cjen Yong, Los Osos, both of Calif.

[73] Assignee: The Regents of the University of California, Berkeley, Calif.

[21] Appl. No.: 116,299

[22] Filed: Jan. 28, 1980

[51] Int. Cl.$^3$ ............................................. B65G 47/14
[52] U.S. Cl. .................................. 198/443; 133/3 A; 198/803
[58] Field of Search ............... 198/392, 397, 443, 454, 198/455, 491, 492, 803, 480–481; 221/156–163, 167–173; 133/3 A; 101/37

[56] References Cited

U.S. PATENT DOCUMENTS 3,042,183  7/1962  Ackley .............................. 198/443 X
3,601,041  8/1971  Perra ....................................... 101/37

Primary Examiner—James B. Marbert
Assistant Examiner—Douglas D. Watts
Attorney, Agent, or Firm—Lothrop & West

[57] ABSTRACT

A singulator for separating a discrete object from a mass of such objects has a rotary, horizontal table on the central top portion of which the mass of objects is randomly arrayed. There are radial pockets at the top periphery of the table. The pockets are alternately opened and closed at their inner ends as the table rotates, preferably by triangular gates at the entry ends of the radial pocket walls. The gates are operated by levers actuated by a stationary cam as the table rotates with respect thereto. As they open and shut, the gates let one object at a time move from the central top portion of the table into a receiving pocket. A driving belt disengages from the wall ends to open the pockets to discharge at their outer ends for part of the table rotation. The belt reengages the pocket walls to close the pockets against discharge for the rest of the table rotation.

8 Claims, 4 Drawing Figures

SINGULATOR

BRIEF SUMMARY OF THE INVENTION

A singulator for separating an individual one of several objects from a somewhat random mass of the objects urges the objects to move individually away from the mass toward one or more segregation points. There are timed gates at such points. The gates open at distinct intervals to let a single object pass away from the initial mass through its segregation point to a discharge point.

DETAILED DESCRIPTION

Figure 1:
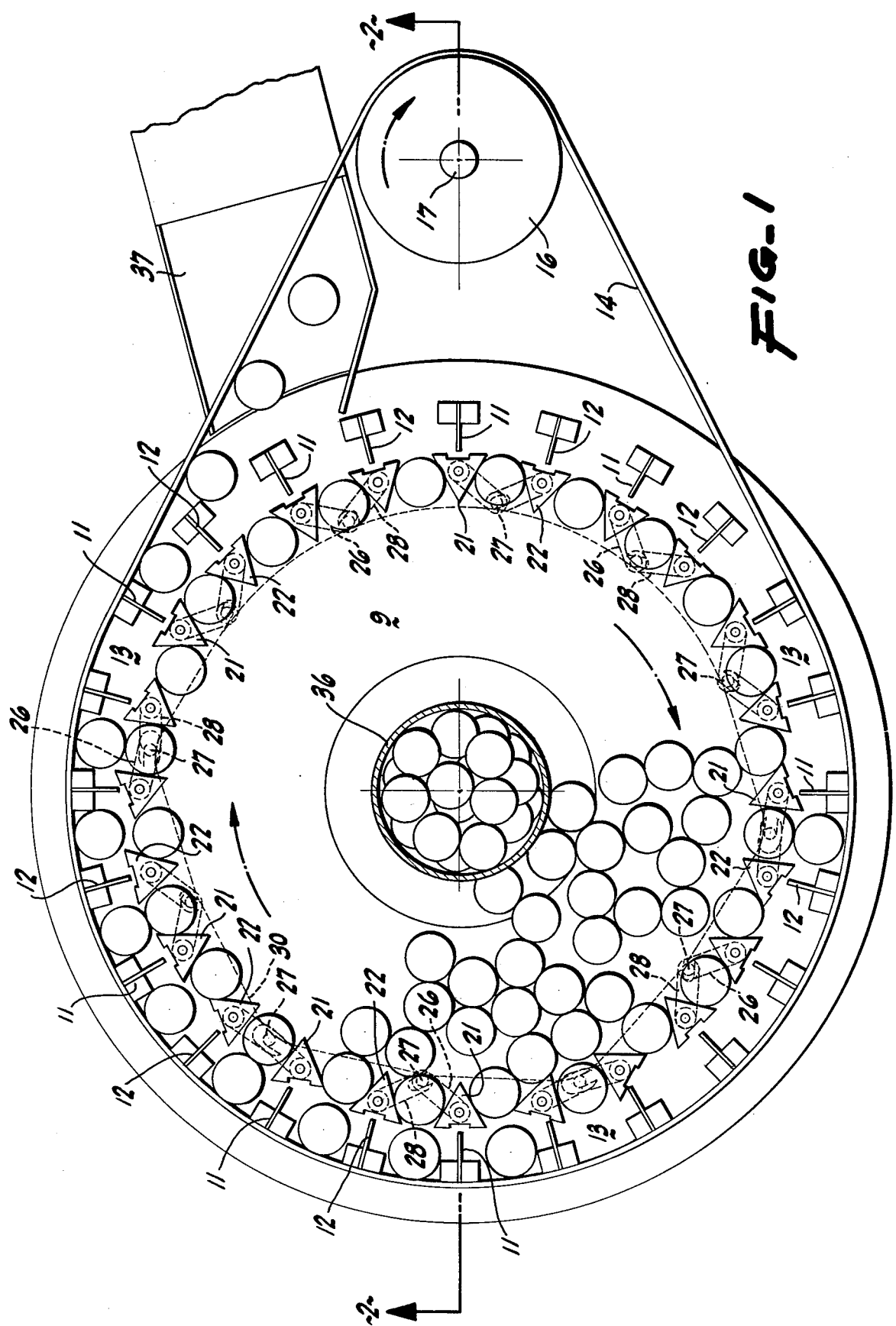
FIG. 1 is a plan of a singulator constructed pursuant to the invention.
Figure 2:
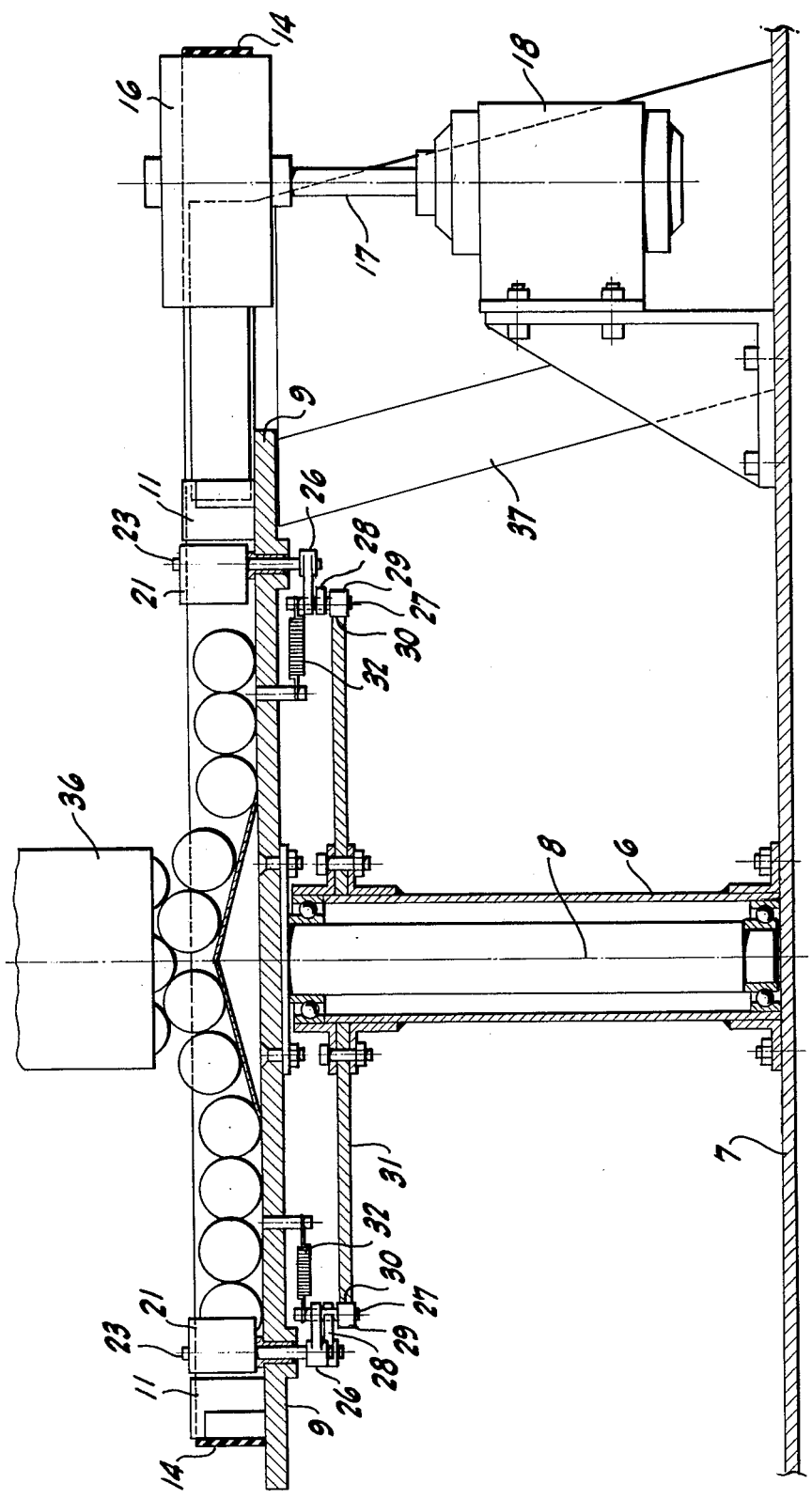
FIG. 2 is a cross-section, the plane of which is indicated by the line 2—2 of FIG. 1.

The singulator is particularly for use with a widely differing range of objects and is especially useful in connection with some agricultural product operations; for example, the singulation of items such as fruits or nuts; say, walnuts. Walnuts are utilized just as an example herein, because the structure operates successfully with many other items.

As especially scaled and arranged for use with walnuts, the singulator includes an upright stand 6 supported on the customary floor 7. Mounted to rotate about a vertical axis 8 coincident with the center of the stand 6 is a table 9. This is preferably a sheet or plate of metal or the like circular in its periphery and journalled concentrically on the upright 6 to turn about the axis 8 and at a convenient height above the floor 7.

The table is especially characterized by a number of upstanding, radial walls such as 11 and 12 extending a short distance inwardly from the outer periphery or rim of the table. The walls are spaced apart circumferentially to define pockets 13 between the successive walls. Each pocket is larger than the maximum dimension of any of the objects that are to be singulated.

In order to rotate the table, there is provided a belt 14 trained around the outer ends of the various walls 11 and 12 for about three-quarters of the periphery of the table and also trained around a driving pulley 16 mounted on a rotary shaft 17 extending from a motor 18. When the motor 18 is energized, the shaft 17 is rotated along with the pulley 16, and the belt 14, in engagement with the ends of the walls 11 and 12, causes the table to rotate about the axis 8.

Mounted on the table 9 are substantially identical gates 21 and 22 arranged respectively at the radially inner ends of each of the walls 11 and 12. An exemplary gate is preferably a block substantially triangular in plan and mounted firmly on its own rod 23. The various, upstanding gate rods 23 are arranged in a circle. They are journalled in the table to extend above the table top substantially to the height of the walls 11 and 12 and also to extend below the table a substantial distance. Each of the rods 23 has its axis spaced far enough from the inner end of its adjacent wall so that the rod 23 and its joined gate can rotate freely about the rod axis in close relationship to but without interference with the related wall.

Below the table and connected to the rods 23 are appropriate mechanisms for producing the desired rotation of the gates. One of each adjacent pair of the rods 23 at its lower end carries a lever 26 provided with an upright pin 27. The paired rod 23 has its own forked lever 28 oppositely directed and also engaging the same pin 27. The common pin 27 carries a roller 29 that is in engagement with the rim 30 of a disc cam 31. Preferably, the cam 31 is stationarily disposed beneath the table top substantially parallel thereto. The cam is approximately circular for some of its periphery but varies from circularity by projecting in a smooth contour in order to produce the desired sequential oscillation of each pair of the levers 26 and 28. This is done through cam contact with each of their joint rollers 29, so moving their respective cam follower pin 27 as the table rotates about the stationary cam 31.

To make sure that each cam follower always remains in contact with the cam periphery, a coil spring 32 is provided for each roller 29 and each pair of levers. The springs are mounted on the table and are effective to urge the levers radially inward or toward the right in FIG. 4.

Pursuant to this arrangement, each one of a pair of the triangular gates 21 and 22 is moved through a predetermined angularity (for example, about sixty degrees) according to the undulations in the cam 31. The rotary movements of the gates in each pair are not exactly the same because of the differing angularities of the levers 26 and 28, but the gate motions are substantially in unison and are the same for practical purposes.

In the operation of this device, the motor 18 is started so that the belt 14 causes rotation of the table. A supply of materials or articles to be singulated is furnished to the table through a superposed, axially extending, central tube 36. This discharges downwardly onto the central area of the table top well within the radially inner limits of the various gates and walls. These objects or materials as they arrive on the table top pick up the table rotation and are then subjected to radially outward, centrifugal forces. It is usually satisfactory to have the table planar and to rely entirely upon centrifugal force for moving the individual items toward the exterior, but it is sometimes preferred to make the table top somewhat conical in order to increase the speed of the outward or radial travel of the objects.

Figure 3:
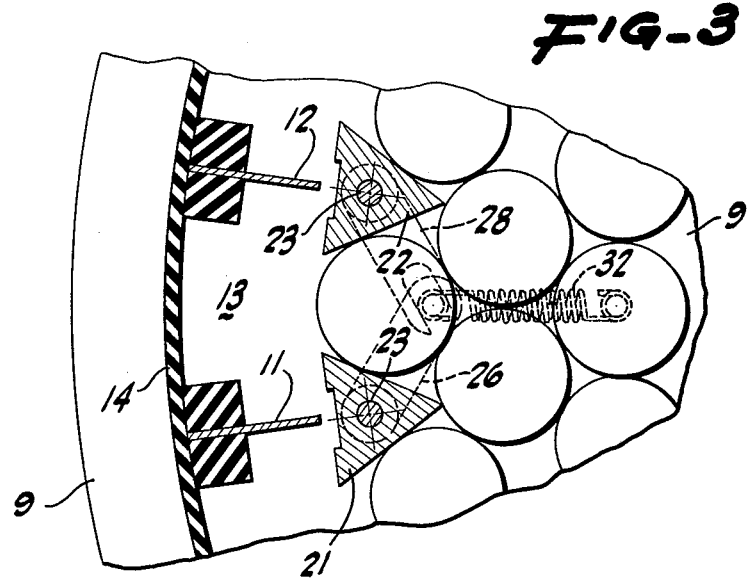
FIG. 3 is a detailed plan showing a portion of the wall and gate arrangement to an enlarged scale.
Figure 4:
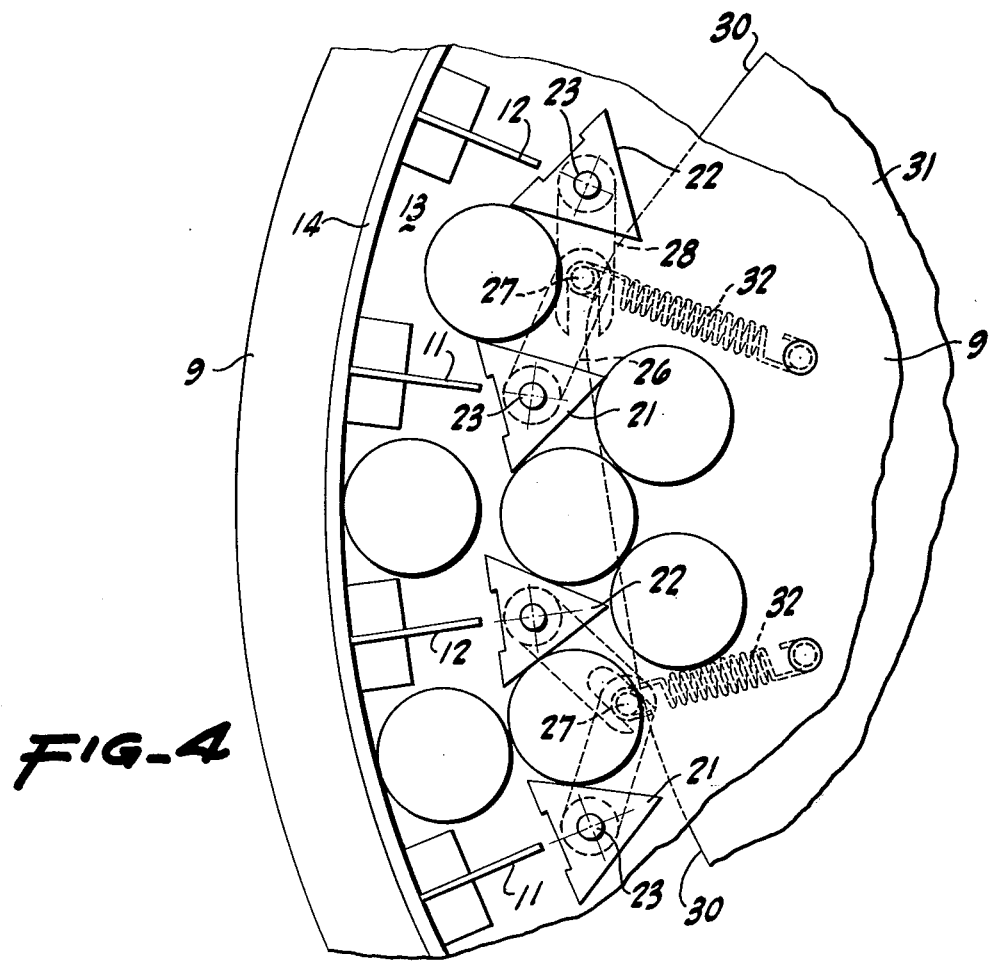
FIG. 4 is a detailed plan comparable to FIG. 3, showing additional pockets.

As the table rotates, the deposited items move somewhat at random and without any particular pattern but travel with large radial components toward and finally against the ring of gates 21 and 22. As the table rotates, there is at least one or there may be several areas or zones in the rotation of the table in which the contour of the cam 31 is such as to cause operation of various of the levers 26 and 28. In such zone, each pair of levers moves left and right in FIG. 4, the movement toward the left in FIG. 4 being against the urgency of its spring 32, and substantially simultaneously rotate the connected rods 23. The related pair of gates 21 and 22 correspondingly rotates from a closed position, as shown in FIG. 3 and at the bottom of FIG. 4, in which radially outward movement of an object is normally prevented, into an open position, as shown at the top of FIG. 4.

Although some adjacent gates are not coupled to linked pairs of levers, they do, even so, operate in a very close time sequence. Thus, such adjacent, unpaired gates are opened and closed in sequence and nearly in unison by the adjacent, cam actuated leverages. Thus, all of the gates in succession virtually duplicate, in timed sequence, the proper gate opening and closing motions.

When adjacent gates open sufficiently, an object from the central area of the table and which may have been bearing directly on the gates then passes by centrifugal force between such open gates and into the adjacent, radially aligned one of the pockets 13 between the walls 11 and 12 or 12 and 11. Each pair of gates is open only for a brief time, since the spring 32 actuates the levers 26 and 28 to close the pair of gates as the cam contour permits. The timing is such that after one object has gotten past the pair of gates into the associated pocket, the gates return in reverse rotation to their initial position. This blocks any further passage of an object until the next actuation. The net result is that only single objects can be separated from the general mass and are then solely present in the particular pocket. Successive, adjacent pockets thus receive only individual ones of the objects from the general mass.

In each pocket, the separated individual object is loosely confined circumferentially and tends to move outwardly by centrifugal force until it abuts and comes to rest against the inner periphery of the surrounding belt 14. That is, the belt not only acts as a driving device, but also acts as an outer barrier or wall for part of the pockets around the circumference. Thus, the individual item in a pocket for much of the rotation is pressed against the belt 14. There may be some circumferential restraints, if desired.

As the table continues to rotate, the belt leaves the ends of the walls 11 and 12 in one portion of such rotation. As especially shown to the right in FIG. 1, there is then no further radial restraint upon any confined objects. Each object then discharges from the table periphery. It is convenient to have each object fall by gravity onto a subjacent receiving conveyor 37. This leads the now-singulated objects away one at a time and in line or series with each other. The originally random mass of objects is thus reoriented into a number of discrete individuals.

We claim:

1. A singulator comprising a table circular about a central, vertical axis; means for rotating said table about said axis; at least a pair of radial walls upstanding from said table and defining the sides of a radial pocket substantially at the periphery of said table away from a central table area; a pair of gates each respectively at the radially inner end of one of said pair of walls; means for moving said gates substantially simultaneously between a first position blocking entrance to said pocket from said central table area and a second position allowing entrance to said pocket from said central table area; means for closing the radially outer end of said pocket for a predetermined portion of the rotation of said table and for opening the radially outer end of said pocket for another portion of the rotation of said table; means for supplying objects to be singulated to said central table area; and means for receiving objects from the open radially outer end of said pocket.

2. A device as in claim 1 in which said means for moving said gates includes a stationary cam concentric with said axis and parallel to said table, and cam followers engaging said cam and respectively connected to said gates.

3. A device as in claim 2 including springs urging said cam followers against said cam.

4. A device as in claim 1 in which said means for closing the radially outer end of said pocket includes a belt trained to engage said radially outer ends of said radial walls.

5. A device as in claim 1 in which said means for rotating said table includes a driven belt trained to engage the radially outer ends of said radial walls.

6. A device as in claim 1 including a plurality of said radial pockets around the periphery of said table and adjacent each other.

7. A device as in claim 1 including a plurality of rods extending upright from said table in substantially radial alignment with said walls and each rod supporting one of said gates.

8. A device as in claim 1 in which each of said gates is substantially triangular in horizontal cross-section.

* * * * *